May 7, 1963     J. R. HUGHES     3,088,580
CONVEYOR
Filed July 20, 1959     2 Sheets-Sheet 1
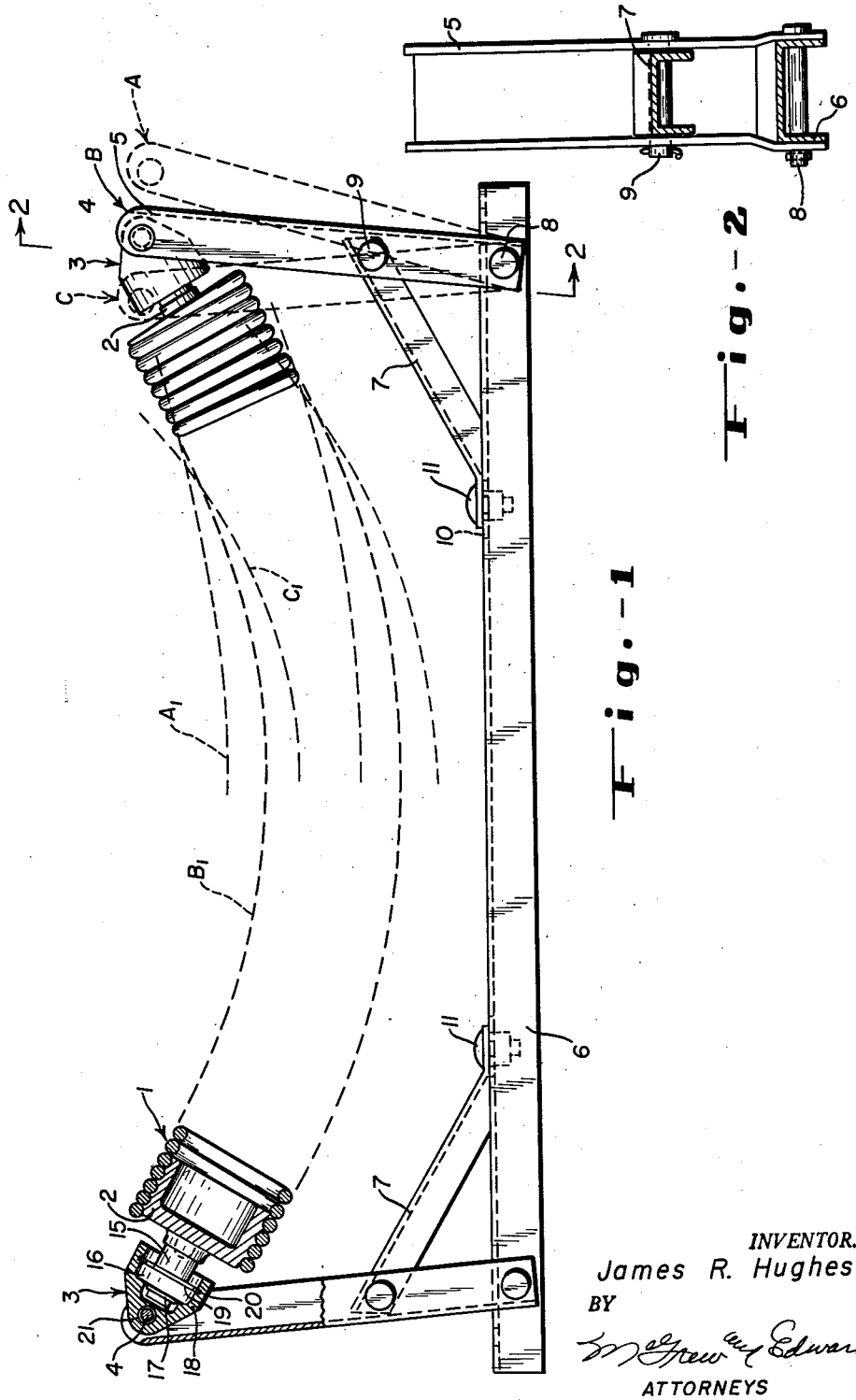
INVENTOR.
James R. Hughes
BY
ATTORNEYS

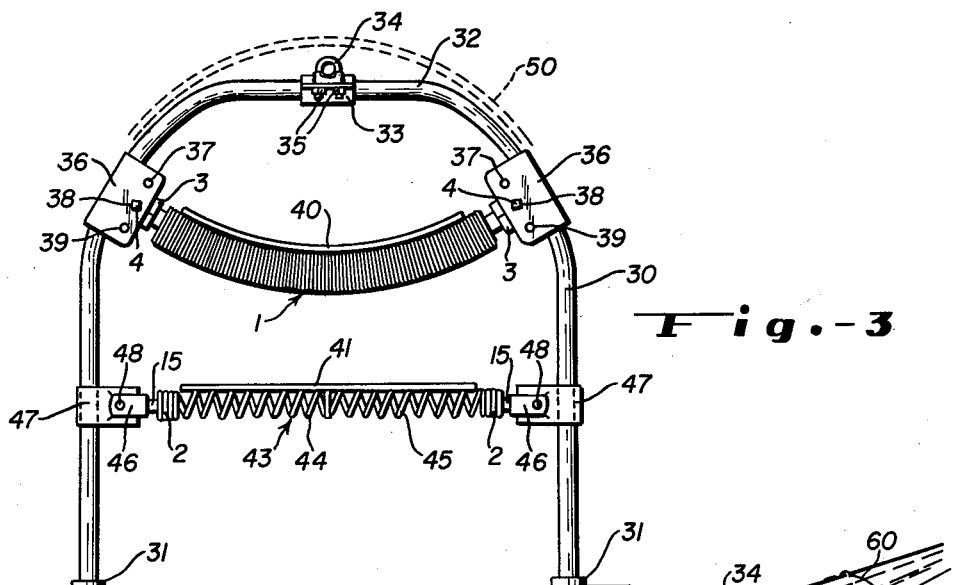
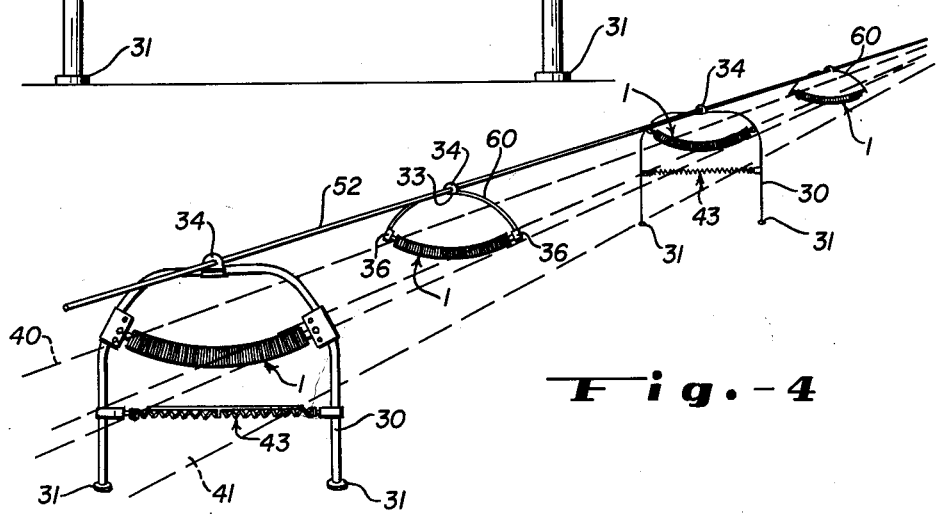
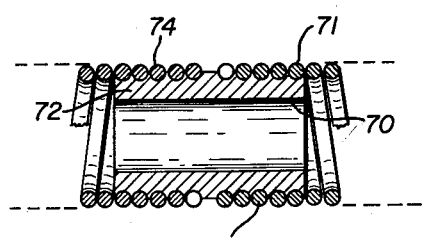
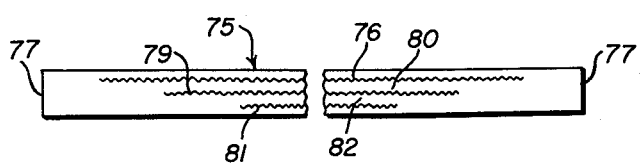

3,088,580
CONVEYOR
James R. Hughes, Sedalia, Colo., assignor to Hughes-Tyler Manufacturing Co., Denver, Colo., a corporation of Colorado
Filed July 20, 1959, Ser. No. 828,089
1 Claim. (Cl. 198—184)

This invention relates to conveyors and more particularly to belt conveyors and supporting structure inclusive of idlers for supporting the belts of such conveyors.

According to the invention there is provided an effective and efficient system using suspended springs as troughing idlers for a belt conveyor. The spring idlers are mounted on adjustable supports to provide for adjusting the troughing of the belt so that a belt conveyor may be adjusted to the optimum load for the particular material being carried. Spring idlers for belt conveyors have heretofore been proposed since they have some apparent desirable features. These spring idlers are resilient and tend to reduce transmission of the impact and shock of loads dumped on the belt to the supporting bearings. The springs supported at each end curve in a natural catenary curve providing a support substantially across the transverse dimension of the belt when such spring idlers have close wound coils. Although such spring conveyor idlers have been suggested, they have not found commercial applicability.

Included among the objects and advantages of the invention is a spring conveyor idler assembly for troughing a conveyor belt in an adjustable trough, and to provide a simplified and effective belt conveyor troughing idler and a return idler. The invention provides for an effective idler troughing adjustment for simply and easily adjusting the suspended curve of the spring idler, and to further provide a simplified conveyor belt frame. In a preferred form a simple U-shaped frame is provided for support for the troughing idlers as well as the return idlers, and a series of such frames may be interconnected by a single cable for maintaining members in upright position.

These and other objects and advantages may be readily ascertained by referring to the following description and appended illustrations in which:

FIG. 1 is a side-elevational view, in partial section, of a spring-idler, belt conveyor support system;

FIG. 2 is an end elevation of an upright support member for the framework of FIG. 1 taken along section line 2—2;

FIG. 3 is a modified framework system for supporting a troughing idler and a return idler;

FIG. 4 is a perspective view, partially schematic, of a section of a belt conveyor utilizing the simplified frame of FIG. 3;

FIG. 5 is a cross-sectional, detailed view of a double wound spring idler according to the invention; and FIG. 6 is a cross-sectional view of a belt according to the invention.

In the device illustrated in FIG. 1, a spring idler shown in general by numeral 1 is supported at each end on and threadedly engaged with a spring mount 2. Each mount is journalled in a bearing assembly, shown in general by numeral 3. Each bearing assembly 3 is pivotally mounted by means of a pin 4 to an upright member 5 in position to permit the spring to hang in substantially a catenary curve. The upright members 5 are mounted on a horizontal member 6 and supported in position by a diagonal brace 7. The upright members 5, which in one form may be a channel, are pivotally mounted by means of a pin 8 to the base 6, and the brace 7 is, likewise, pinned to the upright 5 by means of a pin 9. The brace 7 is adjustably mounted on the base, and is retained by bolt and nut assembly 11 in a slot 10 which permits adjustment. As illustrated at the right-hand end, the position of the upright may be changed by the positioning of the bolt assembly 11 on the base.

The spring support 2, as shown in FIG. 1, is a cup-shaped member having external threads onto which the spring is threaded. The member 2 may be a metal casting which securely supports the spring. A shaft 15 is secured to the casting 2, and a sealed bearing set 16 is mounted on the shaft 15 by means of a retaining ring 17 mounted in a groove, not shown, adjacent the end of the shaft 15. The bearing set 16 is preferably a completely sealed ball-bearing set, as are commercially available, which includes an outer race, a plurality of balls, and an inner race through which the shaft passes. Seals are provided between the inner and outer races completely enclosing the balls forming what is called an oilless bearing. The housing 3 includes a rabbet 18 into which the bearing assembly 16 is mounted with a press fit. A retaining ring 19 mounted in groove 20 maintains the bearing set in the housing 3. The housing 3 is provided with a bore 21 for mounting the housing on the upright 5 with a pin 4. In this position the opening of the housing 3 is pointed generally downwardly which prevents dust or dirt from settling in the housing, and it prevents accidental spilling of rocks and dirt from the belt or loader into the bearing housing.

With both ends of the spring 1 threaded on the castings 2 and each end mounted in the housing 3 and bearing set 16, the idler is mounted on a framework in position to support the conveyor belt. As illustrated in FIG. 1, the curve of the idler may be changed by changing the position of the upright. For example, by moving the upright to position A at both sides, the spring is held to repose in a rather flat catenary curve $A_1$, which is normally referred to as a 20° trough. With the upright in the B position, the spring assumes a catenary curve along $B_1$, which is referred to as a 30° trough, while at the innermost position C, the spring assumes a catenary curve $C_1$ which is known as a 40° trough. As can be seen with the spring flat or in a 20° trough, the belt is supported in a shallow trough and its carrying capacity of flowable materials, such as loose, dry sand, is materially decreased. The supports for the spring idlers, however, may be readily changed to change the belt trough to accommodate the material being carried on a belt.

In the modification illustrated in FIG. 3, a unitary support for the troughing idler and the return idler is composed of a single U-shaped member 30 having feet 31 which may be secured in convenient manner to a supporting framework for the belt conveyor. In one form, the member 30 is a tubular structure formed in the general U-shape. The upper part 32 of the U is flattened slightly from a normal continuous curve, and a clamp 33 is securely fastened to the middle part thereof. The clamp 33 includes a cable clamping eye 34 or U-bolt which may be drawn tightly on an enclosed cable by means of nuts 35. Idler supports 36 are mounted on each side of the U-shaped member in its curving portion and each of the supports includes three spaced apart bolt holes 37, 38 and 39. A spring idler 1, having a housing 3 mounted on each end is fastened in the supports 36 by means of a pin 4 in one of the holes, as illustrated the pins are in the middle holes 38.

A conveyor belt 40 rests on the idlers 1, which may be arranged in series as illustrated in FIG. 4, and the return stretch 41 of the belt is supported by a return idler 43. The return idler 43 is a helical spring which includes one portion 44 wound in one direction and another portion 45 wound in the opposite direction. Each free end of the spring is supported and threaded on a spring support member 2. Shaft 15 secured to each casting is journalled in a bearing housing 46 which is fastened to a return idler support 47 by means of a pin or bolt 48 providing support for the return idler in a generally horizontal position. Where a covered conveyor is desired, a cover 50 may be secured to the supports as indicated in dashed lines in FIG. 3.

The supported spring idler 1 may be changed in curvature by mounting the pins 4 in one of the other sets of holes 37 or 39. In the event a deep trough is desired, the housings 3 are supported from the holes 37. Since the holes 37 are closer together than either the holes 38 or 39, the spring is permitted to trough or hang in a deeper caternary curve. For a flatter curve the idler bearing housings may be supported from holes 39 which tends to support the idler in a flat curve. The return stretch of the belt 41 carries no load, and the return idlers 43 may be stretched taut to hold the belt generally flat and horizontal.

The U-shaped frames 30 may be mounted in series, as indicated in FIG. 4, where two such members are illustrated as mounted on an upright member on a base, not shown, and the U-shaped members are securely clamped to a cable 52 by means of the cable clamp 34. The cable 52 is, of course, firmly anchored at its ends, not shown, and the cable 52 is stretched taut between the anchors. Where necessary the cable may be supported by overhead guy wires, etc. With the feet 31 secured to a framework or other supporting structure, the cable clamp may be secured to the cable 52 to maintain the frame in upright position. The belt is supported by a series of such U-shaped frames mounted along the cable 52, and the spacing of the supports may be readily calculated by known procedures.

In certain instances, the cable 52 may be sufficient to support longer stretches of belt where there is no necessity of supporting the return stretch of the belt. In such cases just the top of the U-shaped member may be utilized, that is, the straight legs of the member 30 may be dispensed with. In this case the bow or upper part of the member 60, illustrated in FIG. 4, is provided with a cable clamp 34 secured to clamp 33, in a manner similar to that illustrated in FIG. 3. The idler supports 36 are mounted on the bow in the same manner as on the members 30, and each idler is suspended in a similar manner to that described for idlers on the full U-shaped member. As shown in FIG. 4, every other support may be a bow suspended from the cable 52. This arrangement provides adequate support for the belt where needed with minimum structure. Further, where long spans are necessary over unsupported areas, the belt conveyor supports 30 may be readily suspended from a cable properly supported, as by guy wires, etc.

In certain instances it has been found that a belt riding on a helical wound spring idler tends to climb the idler in the direction of the wind. To alleviate this particular fault, a double wound helical spring has been used, that is, a helical spring wound in one direction for about half the idler and in the opposite direction on the other half. Heretofore such idlers have been made from a single piece of wire which results in a reverse curve in the middle of the wire to change from one direction to the opposite direction wind. Such reverse winding, since it is subjected to substantial bending distortion on rotation of the idler in belt operation, has not proved satisfactory. As illustrated in FIG. 5, a center member 70 having threaded ends 71 and 72 is provided for securing two short helical springs 73 and 74 together. The member 70 is illustrated as a hollow tubular member, however, other types of connecting elements may be utilized to provide a connector with the threaded ends. The end 71 of the connector is threaded with threads pitched in one direction, and the threads on end 72 are pitched in the opposite direction so that oppositely wound springs may be utilized on such a casting. The free ends, not shown, of these springs may then be threaded on a casting, such as 2 illustrated in FIG. 1 and suspended in a housing 3. Preferably, the helical spring internal diameter should be slightly smaller than the threaded member so as to form a tight frictional fit between the spring and the member. Where desired, the spring may be fastened to the casting by a set screw, welding, or any convenient method.

The ballbearing system mounted in the cup-shaped housing 3 provides a free running idler which is not subject to clogging with dirt and the like since the housing is generally pointed downwardly and there are no ledges for collection of dirt and dust. Where it is desired, a grease fitting may be provided in the housing to maintain the housing full of grease.

With wide belts troughing is generally a minor consideration in the wear and tear since such wide belts trough rather easily and the fabric core of the belt is not subjected to any great stress. This is essentially true in conveyor systems in common commercial use today where the troughing of the belt is not adjustable and is maintained at about 20° which is, as seen in FIG. 1, a very shallow trough. Thus for many materials for which belt conveyors are used, the capacity of the present belt conveyor may be readily and easily adjusted by the idlers. In many cases the capacity equivalent sizes of the belt conveyors with a fixed troughing may be substantially increased by increasing troughing without an increase in the power requirements.

With relatively narrow conveying belts, the distortion produced by the deeper troughing tends to increase the wear of the textile core of the belt, since such belts are relatively stiff and the narrower the belt the greater the stress in the troughing. As illustrated in FIG. 6, a belt 75 is provided with a textile body of three layers, in which an upper layer 76 extends to a point adjacent the outer edges 77 of the belt. The middle core of layer of textile material 79 is substantially narrower than the layer 76 and is separated from the layer by a layer of rubber or flexible material 80. The lowest layer of textile material 81 is substantially narrower than the middle layer 79, and it is separated from the middle layer by means of a layer of rubber or flexible belt material 82. The whole core, of three textile layers and flexible layers, is then enclosed in a rubber or other flexible material sheath 83 as is common practice. The sheath covers the textile core and extends beyond its edges forming a belt. When such a belt is troughed, the upper surface of the belt is essentially in compression and the bottom surface of the belt is in tension or stretch. Thus the three progressively shorter layers of fabric material permits troughing without undue stresses on the textile material and still provides support in the middle of the belt where the greatest load is found. The textile core arrangement thus increases the life of the belt.

While the invention has been illustrated by reference to specific embodiments, there is no intent to limit the spirit and the scope of the invention to the precise details so set forth, except insofar as defined in the following claim.

I claim:

A belt conveyor system comprising a plurality of spaced apart U-shaped members supported by their legs on a foundation, the upper arcuate part of the U-shaped members being secured to cable means and arranged to support a flexible belt-supporting idler suspended from the arcuate section in the upper part of each U-shaped member, means including spaced biased bolt holes carried on opposed sides of the curved portions of each U-shaped member for supporting the ends of said flexible belt-supporting idler at a variable distance apart for predetermining the effective distance between the ends of the belt idler and thereby predetermining the suspended curve of the suspended idler, a return idler mounted on the lower part of each of said spaced apart U-shaped members for supporting the return stretch of a belt, a plurality of arcuate members secured to said cable support means and spaced between said U-shaped members, a flexible belt supporting idler suspended from each arcuate member, means including spaced apart bolt holes carried on opposed sides of each said arcuate member for supporting the ends of said flexible belt-supporting idler at a variable distance apart, and means for securing each of said arcuate members at spaced intervals to said cable means.

References Cited in the file of this patent

UNITED STATES PATENTS

| | | |
|---|---|---|
| 1,980,777 | Zollinger | Nov. 13, 1934 |
| 2,035,873 | Francis | Mar. 31, 1936 |
| 2,121,650 | Berman et al. | June 21, 1938 |
| 2,266,300 | Bebinger | Dec. 16, 1941 |
| 2,278,363 | Broshkevitch | Mar. 31, 1942 |
| 2,310,819 | Van Orden | Feb. 9, 1943 |
| 2,483,345 | Lee | Sept. 27, 1949 |
| 2,555,765 | Shank | June 5, 1951 |
| 2,698,077 | Baechli | Dec. 28, 1951 |
| 2,766,159 | Adams | Oct. 9, 1956 |
| 2,833,395 | Lo Presti | May 6, 1958 |
| 2,876,890 | Baechli | Mar. 10, 1959 |
| 2,889,918 | Bergmann | June 9, 1959 |
| 2,901,093 | Harbottle | Aug. 25, 1959 |
| 2,907,448 | Gleeson | Oct. 6, 1959 |

FOREIGN PATENTS

| | | |
|---|---|---|
| 368,802 | Germany | May 15, 1923 |
| 669,534 | Germany | Dec. 29, 1938 |
| 690,465 | Germany | Apr. 26, 1940 |
| 496,987 | Great Britain | Dec. 9, 1938 |
| 811,287 | Great Britain | Apr. 2, 1959 |
| 535,658 | Italy | Nov. 16, 1955 |